United States Patent [19]

Motooka et al.

[11] Patent Number: 4,612,148

[45] Date of Patent: Sep. 16, 1986

[54] PROCESS FOR PRODUCING STRETCHED ARTICLES OF ULTRAHIGH-MOLECULAR-WEIGHT POLYETHYLENE

[75] Inventors: Masanori Motooka, Yamaguchi; Hitoshi Mantoku, Iwakuni; Takao Ohno, Ohtake, all of Japan

[73] Assignee: Mitsui Petrochemical Industries, Ltd., Tokyo, Japan

[21] Appl. No.: 755,590

[22] Filed: Jul. 16, 1985

Related U.S. Application Data

[62] Division of Ser. No. 566,302, Dec. 28, 1983, Pat. No. 4,545,950.

[30] Foreign Application Priority Data

Dec. 28, 1982 [JP] Japan ............................... 57-227447
Apr. 7, 1983 [JP] Japan ................................. 58-59976

[51] Int. Cl.$^4$ ........................ D01F 1/10; D01D 5/088
[52] U.S. Cl. .................................. 264/49; 264/210.6; 264/210.8; 264/211; 264/289.6
[58] Field of Search ............ 264/41, 49, 210.6, 210.8, 264/211, 289.6, 331.17

[56] References Cited

U.S. PATENT DOCUMENTS

| | | | |
|---|---|---|---|
| 3,502,764 | 3/1970 | Tardella | 264/210 |
| 3,665,068 | 5/1972 | Duling et al. | 264/211 |
| 3,903,234 | 9/1975 | Ikeda et al. | 264/210 R |
| 4,327,009 | 4/1982 | Allen et al. | 524/114 |
| 4,413,110 | 11/1983 | Kavesh et al. | 526/348.1 |
| 4,422,993 | 12/1983 | Smith et al. | 264/210.8 |
| 4,430,383 | 2/1984 | Smith et al. | 428/364 |

FOREIGN PATENT DOCUMENTS

| | | |
|---|---|---|
| 177036 | 10/1982 | Japan . |
| 57-193319 | 11/1982 | Japan . |
| 1171232 | 11/1969 | United Kingdom . |
| 1171442 | 11/1969 | United Kingdom . |
| 2051667 | 1/1981 | United Kingdom . |

OTHER PUBLICATIONS

Chemical Abstracts, vol. 81, No. 24, Dec. 16, 1974, p. 88, No. 153964q, Columbus, Ohio.

*Primary Examiner*—James Lowe
*Attorney, Agent, or Firm*—Sherman and Shalloway

[57] ABSTRACT

Stretched articles of ultrahigh-molecular-weight polyethylene are prepared by melt-kneading a mixture of ultrahigh-molecular-weight polyethylene with a paraffinic wax having a melting point of 40° to 120° C. and a weight average molecular weight of at least 230 but less than 2000 in a screw extruder while maintaining the temperature of the mixture at 180° to 280° C. The molten mixture is melt-extruded through a die at a temperature of 180° to 300° C. under a draft condition of a draft ratio of less than 2 or in the absence of a draft and the resulting unstretched extrudate is cooled to solidify it. The unstretched solidified extrudate is than subjected to a stretching treatment in a heated liquid medium which is a solvent for the paraffinic wax at a temperature of 60° to 140° C. at a particular stretch ratio. Stretch shaped articles of ultrahigh-molecular-weight polyethylene having high tensile strength and modulus of elasticity are produced uniformly and reproducibly. The stretched shaped articles are substantially free from stretching unevenness. Examples of the paraffinic wax include n-alkanes having at least 22 carbon atoms.

7 Claims, No Drawings

PROCESS FOR PRODUCING STRETCHED ARTICLES OF ULTRAHIGH-MOLECULAR-WEIGHT POLYETHYLENE

This is a division of application Ser. No. 566,302 filed Dec. 28, 1983 now U.S. Pat. No. 4,545,950 issued Oct. 8, 1985.

This invention relates to a process for producing stretched articles of ultrahigh-molecular-weight polyethylene, such as stretched filaments, strands, fibers, films, sheets, tapes and the like. Particularly, it relates to a process by which stretched shaped articles of ultrahigh-molecular-weight polyethylene having high tensile strength and modulus of elasticity and a high quality of excellent uniformity and reproducibility and being substantially free from stretching unevenness can be produced easily with industrial advantage and excellent productivity by using a screw extruder.

More specifically, this invention relates to a process for producing a stretched article of ultrahigh-molecular-weight polyethylene, which comprises (1) melt-kneading a mixture composed of (A) 15 to 80 parts by weight, per 100 parts by weight of the components (A) and (B) combined, of ultrahigh-molecular-weight polyethylene having inherent viscosity $[\eta]$, determined at 135° C. in decalin, of at least 5 dl/g, preferably at least 7 dl/g and (B) 85 to 20 parts by weight, per 100 parts by weight of the components (A) and (B) combined, of a paraffinic wax having a melting point, determined by the DSC method, of 40° to 120° C. and a weight average molecular weight ($\overline{Mw}$), determined by the GPC method, of at least 230 but less than 2,000, preferably less than 1,000, in a screw extruder while maintaining the temperature of the mixture at 180° to 280° C., (2) melt-extruding the molten mixture through a die kept at a temperature of 180° to 300° C., (3) cooling the resulting unstretched extrudate to solidify it, and (4) subjecting the unstretched solidified extrudate to a stretching treatment at a temperature of 60° to 140° C. at a stretch ratio of at least about 3 when step (2) is carried out while a draft is applied to the unstretched extrudate or at a stretch ratio of at least about 10 when step (2) is carried out in the absence of a draft.

Ultrahigh-molecular-weight polyethylene is known and commercially available, and has superior impact strength, abrasion resistance, chemical resistance and tensile strength to general-purpose polyethylenes. It has found wider applications as engineering plastics. Since, however, it has a much higher melt viscosity than general-purpose polyethylenes and poor flowability, it is quite difficult, both in respect of the shaping operation and the quality and properties of the resulting shaped articles, to provide practical shaped articles by extrusion molding or injection molding. In the prior art, therefore, ultrahigh-molecular-weight polyethylene is shaped exclusively by compression molding means such as ram extrusion, and extrusion molding means having high productivity cannot be employed. As an exception, only rod-like shaped articles are formed from it by extrusion molding at very low speeds.

For the stretching of monofilaments of high-density polyethylene at high stretch ratios, there were proposed, for example, a method which comprises preparing a dispersion of polyethylene in a high concentration by incorporating 20 to 150%, based on the weight of polyethylene, of an additive having a high boiling point higher than the melting point of polyethylene, forming a primary fibrous material from the dispersion, and hot-stretching it to 3 to 15 times its original length while leaving 5 to 25%, based on the as-spun fibrous material, of the additive therein (Japanese Patent Publication No. 9765/1962) and a method which comprises spinning a solution of linear polyethylene having a molecular weight of at least 400,000, and stretching the filaments at a temperature at which the modulus of the filaments reaches at least 20 GPa (Japanese Laid-Open Patent Publication No. 15408/1981 corresponding to British Pat. No. 2,051,667).

In these previously proposed methods, ultrahigh-molecular-weight polyethylene is dispersed or dissolved in a solvent such as dichlorobenzene, chlorobenzene, nitrobenzene, xylene, solvent naphtha, octane, nonane, decane, toluene, naphthalene, decalin, or tetralin, and spun by specified methods.

When an attempt is made to use such a liquid solvent as a stretchability improver for ultrahigh-molecular-weight polyethylenes in continuous extrusion spinning from a screw extruder, the solvent and the powdery polyethylene cannot at all be mixed because of an excessively great difference in viscosity between the solvent and the powder. Moreover, since the solvent acts as a lubricant between the powder and the screw, the powder and the screw revolve together and extrusion becomes practically impossible. Even if extrusion can be effected, the extrudate cannot be stretched at all because it is not a uniform mixture. Furthermore, it is impossible to perform melt extrusion spinning continuously by a screw extruder. These solvents have relatively low boiling points and high flammability, and are dangerous to use in a screw extruder adapted to be electrically heated.

As a different technique, Japanese Laid-Open Patent Publication No. 177036/1982 (published Oct. 30, 1982) discloses the use of a relatively low-molecular-weight polyethylene as a moldability improver. This patent document proposes a composition composed of 100 part by weight of ultrahigh-molecular-weight polyethylene having a molecular weight of at least 1,000,000 and 10 to 60 parts by weight of low-molecular-weight polyethylene having a molecular weight of 5,000 to 20,000 in order to improve the moldability of the ultrahigh-molecular-weight polyethylene. The molecular weight of the low-molecular-weight polyethylene in this proposal, however, is too high to be suitable for melt-kneading and extrusion molding by a screw extruder. In fact, a ram-extrusion type compression molding means is employed in this patent document. Naturally, this patent document does not at all refer to melt extrusion under a draft nor the stretching of the melt-extrudate.

A technique relying on extrusion molding is known from Japanese Laid-Open Patent Publication No. 193319/1982 (published on Nov. 27, 1982). This patent document states that a compression molding method has been employed industrially for the molding of ultrahigh-molecular-weight polyethylene; extrusion molding having high productivity is scarcely employed for the molding of ultrahigh-molecular-weight polyethylene; and that attempts are made to perform extrusion molding by using a special extruder, but only thick sheets having a narrow width can be obtained at very slow molding speeds and the molded articles have a rough surface and much reduced abrasion resistance. In order to overcome these defects, this patent document proposes a process for producing a sheet of ultrahigh-molecular-weight polyethylene, which comprises extrusion-molding a composition composed of 100 parts by weight of ultrahigh-molecular-weight polyethylene having a molecular weight of at least 1,000,000 and 20 to 70 parts by weight of at least one normallly solid flowability improver selected from the group consisting of aliphatic compounds and alicyclic compounds and having a shear stress, determined by a Koka-type flow tester (with a nozzle having a diameter of 1 mm and a length/diameter ratio of 5) at a temperature of 180° C. and a shear speed of 30 sec$^{-1}$, of $8 \times 10^5$ dyne/cm$^2$ to $4 \times 10^6$ dyne/cm$^2$ at a resin temperature of 160° to 250° C. and a shear speed of 1 to 30 sec$^{-1}$, thereby forming a sheet having a width (W) of at least 200 mm and a width width (W)/thickness (T) ratio (W/T) of at least 150.

Examples of the normally solid flowability improver shown in this patent document include aliphatic hydrocarbons such as paraffin waxes and low-molecular-weight polyethylene having a molecular weight of about 1,000 to 10,000, alicyclic hydrocarbons such as cyclopentene, cyclopentadiene, cyclohexene-type polymers and polymers of C$_2$ fractions in petroleum refining, higher alcohols having at least 15 carbon atoms such as cetyl alcohol and stearyl alcohol, and aliphatic esters such as butyl oleate.

This proposal, however, does not include any technical idea of providing stretched articles such as stretched films or filaments having high tensile strength and modulus of elasticity and being free from stretching unevenness. On the contrary, it is quite silent on the stretching of the molten extrudate of ultrahigh-molecular-weight polyethylene. In its working examples, polyethylene wax or a mixture of polyethylene wax with a DCPD-type petroleum resin or stearyl alcohol is used as the flowability improver and the polyethylene used has a molecular weight of 2,000 to 9,000. Furthermore, this patent document does not at all refer to extrusion molding under a draft.

The present inventors made investigations in order to develop a process for producing stretched articles such as stretched filaments, films or the like of ultrahigh-molecular-weight polyethylene by using an industrially advantageous screw extruder.

These investigations have led to the discovery that stretched shaped articles of ultrahigh-molecular-weight polythylene having high tensile strength and modulus of elasticity and a high quality of excellent uniformity and reproducibility and being substantially free from stretching unevenness can be produced easily with industrial advantage and excellent productivity by a process comprising a combination of steps (1) to (4) described above using a screw extruder in which the aforesaid mixture composed of (A) and (B) is melt-kneaded and extruded from the screw extruder under a draft or without applying a draft, the resulting unstretched extrudate is solidified by cooling and then stretched at a specified temperature at a stretch ratio above the minimum stretch ratio varying depending upon whether a draft has been applied in the extruding step.

It has also been found that stretched articles of ultrahigh-molecular-weight polyethylene having more improved properties can be provided by melt-kneading and extruding the aforesaid mixture in the screw extruder to form the unstretched extrudate under a draft of more than 1, preferably at least 2, and/or using a paraffinic wax (B) having the melting point specified in (B) above and a $\overline{M}w$ of at least 230 but less than 1,000.

It is an object of this invention therefore to provide a process for producing stretched articles of ultrahigh-molecular-weight polyethylene which have excellent properties and have not been provided heretofore.

The above and other objects and advantages of this invention will become apparent from the following description.

The ultrahigh-molecular-weight polyethylene and a method for its production are known, and such polyethylene is commercially available.

The ultrahigh-molecular-weight polyethylene (A) used in this invention has an inherent viscosity $[\eta]$, determined at 135° C. in decalin, of at least 5 dl/g, preferably at least 7 dl/g, particularly 7 to 30 dl/g. When the inherent viscosity of the polyethylene is less than 5 dl/g, a stretched article having excellent tensile strength cannot be obtained by stretching the unstretched solidified extrudate. There is no particular restriction on the upper limit of the inherent viscosity, but the upper limit is preferably 30 dl/g as exemplified above. If the inherent viscosity of the polyethylene is too high beyond 30 dl/g, the melt-spinnability of a mixture of such polyethylene and the paraffinic wax (B) in a screw extruder at the melt-kneading and extruding temperatures specified by the process of this invention tends greatly to be reduced. The use of ultrahigh-molecular-weight polyethylene having an inherent viscosity of up to 30 dl/g is preferred.

The term "ultrahigh-molecular-weight polyethylene", as used in the present application, denotes not only a homopolymer of ethylene but also a copolymer of ethylene with up to 5% by weight of an alpha-olefin having at least 3 carbon atoms, preferably an alpha-olefin having 3 to 8 carbon atoms, such as propylene, butylene, pentene, hexene, 4-methyl-1-pentene, or octene.

The paraffinic wax (B) used in this invention has a melting point, measured by the DSC method, of 40° to 120° C., preferably 45° to 110° C., and a weight average molecular weight ($\overline{M}w$), measured by the GPC method, of at least 230 but less than 2,000, preferably less than 1,000, more preferably not more than 900, especially not more than 800. Paraffinic waxes having a melting point of less than 40° C., such as liquid paraffins, cause the ultrahigh-molecular-weight polyethylene (A) and the screw to revolve together during melt kneading and extruding by a screw extruder, and make it impossible to perform melt shaping stably. Forced melt-shaping would not be able to give extrudates of practical quality. On the other hand, when the melting point of the paraffinic wax is too high above 120° C., there is a restriction on the stretch ratio of the solidified unstretched extrudate obtained by the screw extruder, and the stretched article cannot have high tensile strength and modulus of elasticity. Moreover, since the melt-extrusion is carried out under a draft, molding imperfections such as yarn breakage or film breakage occur, and it is difficult to extract and remove the excess of the component (B) from the stretched article as will be described below.

When the weight average molecular weight of the paraffinic wax is 2,000 or above, the same defects as in the case of the melting point being higher than 120° C. arise. On the other hand, when the weight average molecular weight of the wax (B) is less than 230, the same trouble as in the case of its melting point being lower than 40° C. occurs.

The melting point determined by the DSC method, as referred to in this application, denotes the melting point measured by a differential scanning calorimeter (DSC) in accordance with ASTM D3417.

The weight average molecular weight ($\overline{Mw}$) determined by the GPC method, as referred to in this application, denotes the weight average molecular weight measured by GPC (gel-permeation chromatography) under the following conditions.
Device: Model 150C, made by Waters Co.
Column: TSK GMH-6 (6 mm $\emptyset \times$ 600 mm) made by Toyo Soda Co., Ltd.
Solvent: ortho-dichlorobenzene (ODCB)
Temperature: 135° C.
Flow rate: 1.0 ml/min.
Injecting concentration: 30 mg/20 ml ODCB (the amount injected 400 microliters)

The column elution volume is corrected by the universal method using standard polystyrene made by Toyo Soda Co., Ltd. and Pressure Chemical Co.

The paraffinic wax (B) used in this invention may be any paraffinic wax which meets the above melting point and weight average molecular weight requirements specified above, and needs not to be composed only of carbon and hydrogen. For example, it may have a minor amount of oxygen or other elements.

The paraffinic wax (B) may be a variety of substances containing as a main component saturated aliphatic hydrocarbon compounds having the aforesaid melting points and weight average molecular weights. Specific examples include n-alkanes having at least 22 carbon atoms such as tricosane, tetracosane and triacontane or mixtures of a major proportion of these n-alkanes with a minor proportion of lower n-alkanes; paraffin waxes separated from petroleum and purified; low pressure method, medium pressure method or high pressure method polyethylene waxes or ethylene copolymer waxes having a relatively low molecular weight which are obtained by polymerizing or copolymerizing ethylene or ethylene and another alpha-olefin and/or a diene; polyethylene or ethylene copolymer waxes obtained by reducing the molecular weights of polyethylene or ethylene coplymers having a relatively high molecular weight by such means as heat degradation; and oxidized waxes or alpha, beta-unsaturated acid-modified waxes such as the oxidation products or maleinized products of the above-exemplified waxes. From these paraffinic waxes, those having the above-specified melting points and weight average molecular weights are selected and used in the present invention.

Naphthalene (melting point about 80° C.; molecular weight 128), for example, exemplified as an additive in Japanese Laid-Open Patent Publication No. 15408/1981 is a hydrocarbon compound not included within the scope of the paraffinic wax (B) specified in the present invention. As shown in Comparative Example 5 shown hereinbelow, when naphthalene is used together with the ultrahigh-molecular-weight polyethylene (A) specified in this invention and melt-kneaded and melt-extruded by a scew extruder, a strand of uniform quality cannot be formed because of the poor compatibility of naphthalene with the polyethylene (A) and therefore it cannot be stretched uniformly nor at such a high stretch ratio as can give a satisfactory stretched article. Likewise, as shown in Comparative Example 4 given hereinbelow, n-hexadecane (melting point 18.14° C.; molecular weight 226), a $C_{16}$ saturated hydrocarbon not included within the scope of the paraffinic wax (B) specified in the present invention, cannot be used in the process of this invention.

In step (1) of the process of this invention, a mixture composed of the aforesaid ultrahigh-molecular-weight polyethylene having an inherent viscosity [η], determined at 135° C. in decalin, of at least 5 dl/g, preferably at least 7 dl/g, and the paraffinic wax (B) having a melting point, determined by the DSC method, of 40 to 120° C. and a weight average molecular weight $\overline{Mw}$, determined by the GPC method, of at least 230 but less than 2,000, preferably less than 1,000, in the proportions specified above is melt-kneaded in a screw extruder while the temperature of the mixture is maintained at 180° to 280° C.

Consequently, there is obtained a molten mixture of (A) and (B) which can be subsequently melt-extruded with or without applying a draft and after cooling, subjected to a stretching treatment, with little or no unevenness in extrusion and stretching to provide a product having a high quality of excellent uniformity.

The mixture of the polyethylene (A) and the paraffinic wax (B) to be melt-kneaded can be prepared by properly selecting known mixing means such as a Henschel mixer and a V-blender at a temperature of, for example, room temperature to 120° C. It is also possible to prepare the mixture by such means, melt-knead it in a single or multiple screw extruder in the same way as in step (1), then granulate the mixture to form molding pellets and use the molding pellets in step (1) of the process of this invention.

The proportion of the ultrahigh-molecular-weight polyethylene (A) is 15 to 80 parts by weight, preferably 20 to 60 parts by weight, and the proportion of the paraffinic wax (B) is 85 to 20 parts by weight, preferably 80 to 40 parts by weight, both per 100 parts of the components (A) and (B) combined.

If the amount of the ultrahigh-molecular-weight polyethylene (A) is less than 15 parts by weight, the resulting mixture is difficult to melt-knead uniformly in the screw extruder and obtain a uniform molten mixture. Furthermore, when the resulting mixture is melt extruded in step (2) under a draft, a trouble of breakage of the molded article occurs. The same trouble occurs in the stretching treatment in step (3) to be carried out after the unstretched extrudate has been solidified by cooling. On the other hand, when the proportion of the polyethylene (A) exceeds 80 parts by weight (namely, the proportion of the paraffinic wax (B) is too small), melt-kneading in the screw extruder becomes difficult, and the melt viscosity of the molten mixture becomes unduly high so that melt-extrusion in step (2) becomes difficult. Furthermore, there is a marked roughening of the surface of the resulting unstretched extrudate, and a trouble of breakage of the article occurs during the stretching treatment after solidification and during the melt extrusion under a draft.

In step (1), the melt-kneading in the screw extruder is carried out while the temperature of the mixture of (A) and (B) is maintained at 180° to 280° C., preferably 180° to 250° C. If the temperature is lower than the lower limit specified above, the melt viscosity of the molten mixture is too high so that uniform kneading is difficult. If the temperature is too high, the ultrahigh-molecular-weight polyethylene (A) itself is degraded and unduly reduced in molecular weight, and it is difficult to provide a stretched article having the desired high tensile strength and modulus of elasticity. The temperature of the mixture of (A) and (B) can be measured and determined by the method described in Chapter 10: Experimental Temperature and Pressure Measurement of "Engineering Principles of Plasticating Extrusion" written by Zehev Tadmor and Imrich Klein and published by Robert E. Krieger Publishing Company, Huntington, New York (1978).

There is no particular restriction on the screw extruder used. For example, a single screw extruder, a multiple screw extruder and other various known-types of screw extruders can be used.

In step (2) of the process of this invention, the molten mixture of (A) and (B) obtained in step (A) is melt-extruded from a die provided at the extrusion end of the extruder and kept at a temperature of 180° to 300° C., preferably 180° to 270° C.

If the temperature of the die is lower than the specified lower limit, the melt-extruding operation becomes difficult, and an attempt to extrude the molten mixture forcibly results in non-uniform extrusion. If the temperature of the die is higher than the above-specified upper limit, the ultrahigh-molecular-weight polyethylene (A) itself is degraded and reduced unduly in molecular weight, and a stretched article having the desired high tensile strength and modulus of elasticity is difficult to obtain.

The die used can be properly selected according to the desired shape of the unstretched extrudate. For example, when a die of the spinneret type is used, filaments or strands can be obtained by melt extrusion. Or a tape, film or sheet can be molded by melt extrusion by using a lip die or a T-die for tapes, films, and sheets.

In the process of this invention, the unstretched extrudate formed as in step (3) is cooled and solidified. At this time, the as-formed unstretched extrudate before cooling can be melt-extruded as described above under a draft, and this gives better results. Means for applying a draft to the as-formed unstretched extrudate are known, and can be utilized in the process of this invention. A draft can be applied by taking up the extrudate at a higher take-up linear speed than the extrusion linear speed in step (2). According to one embodiment, in subjecting the unstretched extrudate formed by melt extrusion in step (2) to the cooling and solidification treatment in step (3), a drafting action can be exerted on the as-formed unstretched extrudate by taking up its cooled product solidified to such an extent as can be taken up, at a larger take-up linear speed than the melt-extrusion linear speed. For example, as shown in Examples given hereinbelow, an air gap of a suitable desired distance is provided between the melt-extrusion die and a cooling medium, for example, the water surface of a cooling tank containing cold water, for cooling and solidifying the unstretched extrudate extruded from the die, and the unstretched extrudate is taken up by a take-up roll or bar disposed in the cold water and cooled and solidified. By taking up the unstretched extrudate at a larger take-up linear speed than the extrusion linear speed of the molten mixture of (A) and (B) from the die, a drafting action can be exerted on the unstretched extrudate.

When a draft is to be exerted on the unstretched extrudate by melt extrusion in the process of this invention, the draft ratio is more than 1, preferably not less than 2.

In the present invention, the draft ratio denotes the ratio of the diameter $r^1$ of a die orifice (the diameter of an as-spun filament) to the diameter $r^2$ of the solidified filament ($r^1/r^2$), or the ratio of the die lip clearance $d^1$ (the thickness of the asformed film) to the thickness $d^2$ of the solidified film ($d^1/d^2$).

Cooling and solidification in step (3) of the process of this invention can be carried out by any desired means by which the unstretched extrudate formed by step (2) on which a draft has been, or has not been, exerted as above, can be cooled and solidified. For example, it can be carried out by contacting the extrudate with a gaseous cooling medium such as cooled air or a cooled inert gas, a liquid cooling medium such as cold water, or other suitable cooling media. The cooling temperature is, for example, about $-20°$ C. to about 60° C.

In step (4) of the process of this invention, the solidified product obtained in step (3) is subjected to stretching treatment. The solidified unstretched extrudate is subjected to a stretching treatment at a temperature of 60° to 140° C. at a stretch ratio of at least about 3:1, for example from 3:1 to 50:1, when the above melt-extrusion is effected while applying a draft to the resulting unstretched extrudate, and at a stretch ratio of at least about 10:1, for example from 10:1 to 100:1 when the melt-extrusion is effected without application of a draft. The stretch ratio can be varied properly depending upon not only the presence or absence of drafting but also the draft ratio, the weight average molecular weight ($\overline{M}w$) of the paraffinic wax (B). Let us assume, for example, that an unstretched extrudate formed without drafting is cooled and solidified and then subjected to a stretching treatment. If the $\overline{M}w$ of the paraffinic wax (B) is less than about 800, a satisfactory stretched article having a high modulus of elasticity can be obtained. But when the $\overline{M}w$ of the paraffinic wax (B) is more than about 800 and up to about 2,000, better results are obtained by employing a stretch ratio of at least about 15:1, preferably at least about 17:1. On the other hand, let us assume that an unstretched extrudate formed under a draft is cooled and solidified and then subjected to a stretching treatment. In this case, a satisfactory stretched article of a high modulus of elasticity can be obtained at a stretch ratio of at least about 3:1 if the $\overline{M}w$ of the paraffinic wax (B) is not more than about 800. When the $\overline{M}w$ of the paraffinic wax (B) is more than about 800 and up to about 2,000, better results are obtained by employing a stretch ratio of at least about 5:1, preferably at least about 10:1.

The stretching treatment is carried out at a temperature of 60° to 140° C., preferably 100° to 135° C. If the stretching temperature is below the above-specified lower limit, it is difficult to stretch the extrudate at the desired stretch ratio. If, on the other hand, it is higher than the specified upper limit, the ultrahigh-molecular-weight polyethylene (A) becomes too soft and a stretched article having a high modulus of elasticity cannot be obtained although the extrudate can be stretched.

The treatment can be performed at the above temperature by stretching means known per se. For example, in the case of a filament or strand, a pair of godet rolls may be used for example, and the relative linear speed of the godet rolls is properly changed and selected so that stretching is effected at the desired stretch ratio. A film or tape, on the other hand, is stretched by using a pair of snap rolls, for example. Hot stretching may be carried out in an atmosphere of a heat medium, for example in an atmosphere of heated air, steam, a heated liquid, etc. Or it can be carried out by using heat waves or a hot plate. These means may be used in combination.

Preferably, the hot stretching is carried out in an atmosphere of a heat medium. It is especially preferred to use as the heat medium a solvent (liquid medium) which can dissolve the paraffinic wax (B) or remove it by leaching and has a boiling point higher than the stretching temperature employed, preferably a boiling point at least about 10° C. higher than the stretching temperature employed. Examples of the liquid medium are decalin, decane and kerosene. By employing this preferred embodiment, the excess of the paraffinic wax (B) can be removed by extraction or leaching simultaneously with the stretching treatment, and it becomes possible to reduce unevenness in stretching and perform stretching at a high stretch ratio. Of course, the excess of the paraffinic wax (B) may be removed by other means. For example, it can be achieved by treating the solidified unstretched extrudate with such a solvent as hexane or heptane prior to the stretching treatment. Or the stretched product may be subjected to a similar solvent treatment.

Fibers having fine pores can be obtained by removing the paraffinic wax (B) such that the amount of the wax (B) remaining in the stretched article is not more than about 10% by weight. The modulus of elasticity and tensile strength of such fibers which are determined by a method involving measuring the true cross-sectional area of the fibers on a weight basis do not fall below those of the fibers before extraction of the paraffinic wax (B). This embodiment is therefore preferred.

If in step (4), the stretch ratio in the aforesaid solvent is less than 3:1 in stretching the solidified product of the unstretched extrudate obtained under a draft, it is frequently the case that the tensile strength and the modulus of elasticity of the stretched article increase only to a small extent, and stretching unevenness occurs in the stretched article to degrade its appearance. On the other hand, if in step (4), the stretch ratio in the aforesaid solvent is less than 10:1 in stretching the solidified product of the unstretched extrudate obtained without applying a draft, it is frequently the case that the tensile strength and the modulus of elasticity of the stretched product increase only to a small extent and the polyethylene in the stretched article is whitened to degrade the appearance of the stretched article.

The stretching treatment in step (4) needs not to be performed in one stage. If desired, it can be performed in a multiplicity of stages. When the latter is employed, the stretch ratio specified in step (4) of the process of this invention denotes the total of stretch ratios in the individual stages. The final stretching speed in the stretching treatment is not particularly restricted. But from the viewpoint of productivity, it is preferably at least 3 m/min., more preferably at least 5 m/min. Usually, the stretching is carried out monoaxially in the extruding direction (machine direction). In the case of a film or sheet, the stretching may further be carried out in the transverse direction (biaxial stretching). The stretching in the transverse direction can be carried out under the same conditions as described above except that the stretch ratio is set at 1.5:1 or higher, preferably at 2:1 or higher.

In the unstretched extrudate formed by steps (1) and (2) of the process of this invention, the compatibility between the component (A) and the component (B) is excellent and they form a very homogeneous mixture. This state can be ascertained, for example, by observing the sectional surface of the unstretched filament or film with a high magnification scanning electron microscope. Taking up a filament as an example, a blend of the ultrahigh-molecular-weight polyethylene (A) and the paraffinic wax (B) in equal proportions is melt-kneaded and melt-spun by using a screw extruder. The resulting unstretched filament is cut by a sharp blade such as a microtome in a direction at right angles to its longitudinal direction to form a sample (a). By the same method, another sample (b) is cut out from the unstretched filament and then immersed at room temperature in a non-polar solvent such as hexane or heptane for at least 1 hour to remove the paraffinic wax (B) by extraction. The sectional surface of the sample (a) and the sectional surface of the sample (b) after extraction are both observed compartively with a scanning electron microscope at a magnification of at least 3,000. The same procedure can be used for a film.

Since the paraffinic wax (B) of this invention has good compatibility with the ultrahigh-molecular-weight polyethylene (A), depressions of a size above 0.1 micron are scarcely observed. On the other hand, when, for example, naphthalene mentioned hereinabove is used instead of the paraffinic wax (B), its dispersion in the polyethylene is poor and innumerable depressions of a size above 0.1 micron are observed in the final stretched article.

If desired, the stretched articles of ultrahigh-molecular-weight polyethylene obtained by the process of this invention may contain other additives. These additives are preferably blended with the polyethylene (A) or the mixture of the polyethylene (A) and the paraffinic wax (B) in step (1). If desired, however, they may be added and mixed during melt-kneading in the screw extruder.

These additives may be various additives convenitionally used for polyolefins, for example heat stabilizers, weatherability stabilizers, coloring agents and fillers. The amounts of these additives blended may be properly selected within the ranges which do not impair the objects of this invention. For example, they are about 0.01 to about 1% by weight for the heat stabilizers, about 0.01 to about 2% by weight for the weatherability stabilizers, and about 0.01 to about 5% by weight for the coloring agents.

Examples of the heat stabilizers are phenolic compounds such as 2,6-di-tert-butyl-4-methylphenol and 2,2-thiobis-(6-tert-butyl-4-methylphenol) and amine compounds such as phenyl-1-naphthylamine.

An example of the weatherability stabilizers is 2-(2-hydroxyphenyl)benzotriazole.

Examples of the coloring agent or fillers are phthalocyanine pigments, nitroso lake pigments, titanium oxide, zinc oxide, precipitated silica, and carbon black.

The stretched articles of ultrahigh-molecular-weight polyethylene obtained by the process of this invention have high tensile strength and modulus of elasticity which cannot be obtained with conventional stretched articles of polyethylene. Accordingly, they can find use as fibers having high tensile strength and modulus of elasticity as well as in conventional applications of stretched articles such as monofilaments and tapes. They can be used as various reinforcing materials which require light weight. Furthermore, by utilizing a high degree of crystal orientation due to stretching at very high ratios and micropores formed secondarily by the extraction of the excess of the paraffinic wax (B), these stretched articles can find applications as various functional materials such as selective membranes and electrets.

The following examples illustrate the present invention more specifically. It should be noted that the invention is not limited to these examples alone unless it departs from the scope of the present invention.

EXAMPLE 1

A 39:61 blend of ultrahigh-molecular-weight polyethylene ($[\eta]=8.20$ dl/g) and paraffin wax (melting point=69° C., molecular weight=460) was melt-spun and stretched under the following conditions.

A powder of ultrahigh-molecular-weight polyethylene and pulverized paraffin wax were mixed, and then melt-kneaded by using a screw extruder (20 mm in diameter; L/D=20) while maintaining the temperature of the mixture at 190° C. The molten mixture was extruded from a die with an orifice diameter of 1 mm in the absence of a draft, and solidified in cold water at 20° C. with an air gap of 10 cm. Subsequently, the extrudate was stretched in a stretching vessel (the temperature of the inside of the vessel 130° C.; the length of the vessel 40 cm) containing n-decane as a heat medium by means of a pair of godet rolls. The stretch ratio was determined by calculation from the rotation ratio of the godet rolls. Table 1 summarizes the moduli of elasticity, tensile strengths and the amounts of the residual paraffin wax at the various stretch ratios.

The modulus of elasticity was measured by means of a dynamic viscoelasticity measuring device (Vibron DDV-II, made by Toyo Baldwin Co., Ltd.) at room temperature (23° C.) and a vibration frequency of 110 Hz. The tensile strength was measured by an Instron universal tester (Model 1123, made by Instron Company) at room temperature (23° C.). At this time, the length of the sample between the clamps was adjusted to 100 mm, and the pulling speed, to 100 mm/min. The cross sectional area of the filament required for measurement was determined by measuring the weight and length of the filament with the density of polyethylene taken as 0.96 g/cm³. The amount of the residual paraffin wax was measured after the filament was immersed for 24 hours in n-hexane and the paraffin wax was removed from the filament.

It is seen from Table 1 that when the stretch ratio is not more than 10:1, stretched articles having a high modulus of elasticity cannot be obtained.

TABLE 1

| | Stretch ratio | | | | |
|---|---|---|---|---|---|
| Run No. | 10.0 1 | 20.0 2 | 25.5 2 | 30.2 4 | 35.5 5 |
| Modulus of elasticity (*) (GPa) | 18.6 | 59.2 | 68.4 | 89.3 | 106.0 |
| Tensile strength (GPa) | 0.66 | 1.02 | 1.21 | 1.34 | 1.4 |
| Amount of residual paraffin (wt. %) | 10.7 | 5.8 | 6.9 | 7.7 | 6.2 |

(*)Measured by a dynamic viscoelasticity measuring device (Vibron DDV-II).

EXAMPLE 2

A 50:50 blend of ultrahigh-molecular-weight polyethylene ($[\eta]=8.20$ dl/g) and paraffin wax (melting point=109° C., molecular weight=900) was melt-spun and stretched under the same conditions as in Example 1. Table 2 shows the moduli of elasticity and tensile strengths of the resulting products at the various stretch ratios. It is seen from Table 2 that at a stretch ratio of 10:1 or less, a stretched article having a high modulus of elasticity cannot be obtained, and when stretching is carried out at a stretch ratio of more than 17:1, a stretched article having a higher modulus of elasticity can be obtained.

TABLE 2

| | Stretch ratio | | | | |
|---|---|---|---|---|---|
| Run No. | 10.0 6 | 15.3 7 | 17.4 8 | 20.0 9 | 25.6 10 |
| Modulus of elasticity (*) (GPa) | 16.0 | 26.5 | 31.2 | 50.5 | 71.2 |
| Tensile strength (GPa) | 0.70 | 0.92 | 1.08 | 1.24 | 1.32 |

(*) Measured by Vibron DDV-II.

EXAMPLE 3

A 50:50 blend of ultrahigh-molecular-weight polyethylene ($[\eta]=8.20$ dl/g) and paraffin wax (melting point=42°–44° C., molecular weight=300) was melt-spun and stretched under the same conditions as in Example 1. Table 3 shows the moduli of elasticity, tensile strengths and the amounts of residual paraffin wax at the various stretch ratios.

TABLE 3

| | Stretch ratio | | | | |
|---|---|---|---|---|---|
| Run No. | 12.8 11 | 15.3 12 | 17.5 13 | 19.9 14 | 24.0 15 |
| Modulus of elasticity (*) (GPa) | 30.0 | 42.4 | 41.6 | 49.5 | 64.3 |
| Tensile strength (GPa) | 0.83 | 1.02 | 1.12 | 1.23 | 1.29 |
| Amount of residual paraffin (wt. %) | 28.6 | 35.9 | 32.9 | 28.1 | 25.3 |

(*) Measured by Vibron DDV-II.

EXAMPLE 4

A 50:50 blend of ultrahigh-molecular-weight polyethylene ($[\eta]=8.20$ dl/g) and paraffin wax (melting point=52°–54° C., molecular weight=350) was melt-spun and stretched under the same conditions as in Example 1. Table 4 summarizes the moduli of elasticity and the amounts of residual paraffin at the various stretch ratios.

TABLE 4

| | Stretch ratio | | | | | |
|---|---|---|---|---|---|---|
| Run No. | 12.9 16 | 15.3 17 | 17.0 18 | 20.0 19 | 25.7 20 | 29.7 21 |
| Modulus of elasticity (*) (GPa) | 25.2 | 40.2 | 45.2 | 49.8 | 84.1 | 85.4 |
| Amount of residual paraffin (wt. %) | 10.7 | 12.9 | 14.9 | 15.8 | 15.4 | 16.3 |

(*) Measured by Vibron DDV-II.

EXAMPLE 5

A 17:83 blend of ultrahigh-molecular-weight polyethylene ($[\eta]=19.6$ dl/g) and paraffin wax (melting point=69° C., molecular weight=460) was melt-spun and stretched under the same conditions as in Example 1. Table 5 summarizes the moduli of elasticity at the various stretch ratios. It is seen from Table 5 that when the stretch ratio is not more than 10:1, a stretched article having a high modulus of elasticity cannot be obtained.

TABLE 5

| | Stretch ratio | | | | |
|---|---|---|---|---|---|
| Run No. | 10.0 22 | 12.9 23 | 15.3 24 | 17.0 25 | 20.3 26 |
| Modulus of elasticity (*) (GPa) | 17.0 | 42.1 | 60.9 | 71.5 | 83.0 |

(*) Measured by Vibron DDV-II.

COMPARATIVE EXAMPLE 1

A 50:50 blend of ultrahigh-molecular-weight polyethylene ($[\eta]=8.20$ dl/g) and high-density polyethylene (melting point=130° C., molecular weight=40,000) was melt-spun and stretched under the same conditions as in Example 1. Table 6 summarizes the moduli of elasticity at the various stretch ratios. With the above blend, a high stretch ratio could not be achieved, and filaments having a high modulus of elasticity could not be obtained.

TABLE 6

| | Stretch ratio | | | |
|---|---|---|---|---|
| Run No. | 5.4 27 | 7.7 28 | 10.5 29 | 16.1 30 |
| Modulus of elasticity (*) (GPa) | 2.0 | 7.0 | 14.2 | Breakage occurred during stretching |

(*) Measured by Vibron DDV-II.

COMPARATIVE EXAMPLE 2

A 95:5 blend of ultrahigh-molecular-weight polyethylene ($[\eta]=8.20$ dl/g) and paraffin wax (melting point=69° C., molecular weight=460) was melt-spun under the same conditions as in Example 1. With this blend, the molten blend could not be extruded from the die orifice of the screw extruder.

COMPARATIVE EXAMPLE 3

A 5:95 blend of ultrahigh-molecular-weight polyethylene ($[\eta]=8.20$ dl/g) and paraffin wax (melting point=69° C., molecular weight=460) was melt-spun under the same conditions as in Example 1. The resulting strand cooled by an air gap was fragile, and could not be stretched by godet rolls.

COMPARATIVE EXAMPLE 4

A 50:50 blend of ultrahigh-molecular-weight polyethylene ($[\eta]=19.6$ dl/g) and n-hexadecane was melt-spun and stretched under the same conditions as in Example 1. Since a uniform strand could not be obtained, unevenness in stretching occurred, and uniform filaments could not be obtained.

COMPARATIVE EXAMPLE 5

A 50:50 blend of ultrahigh-molecular-weight polyethylene ($[\eta]=8.20$ dl/g) and naphthalene was melt-spun and stretched under the same conditions as in Example 1. Since a uniform strand could not be obtained, unevenness in stretching occurred, and uniform filaments could not be obtained.

EXAMPLE 6

A 25:75 blend of ultrahigh-molecular-weight polyethylene ($[\eta]=8.20$ dl/g) and paraffin wax (melting point=69° C., molecular weight=460) was melt-spun and stretched under the following conditions. A powder of the polyethylene and pulverized paraffin wax were mixed and melt-kneaded by a screw extruder (20 mm in diameter, L/D=20) while the temperature of the mixture was maintained at 190° C. The molten mixture was then extruded from a die having an orifice diameter of 1 mm, and solidified in cold water at 20° C. with an air gap of 10 cm. The melt-extrusion was performed under a draft so that the diameter of the solidified filament became 0.50 mm (specifically, at a draft ratio of 2). Subsequently, the resulting unstretched filament was stretched in a stretching vessel (the temperature of the inside of the vessel=130°C., the length of the vessel=40 cm) containing n-decane as a heat medium by means of a pair of godet rolls.

While the rotating speed of a first godet roll was adjusted to 0.5 m/min., filaments of different stretch ratios were produced by changing the rotating speed of a second godet roll. The stretch ratios were calculated from the rotating ratios of the godet rolls. Table 7 summarizes the moduli of elasticity and strengths at the various stretch ratios. It is seen from Table 7 that a stretched article of high strength can be obtained when the stretch ratio is set at 10:1 or higher.

The moduli of elasticity and tensile strengths were measured by an Instron universal tester (Model 1123, made by Instron Company) at room temperature (23° C.). The length of the sample between the clamps was adjusted to 100 mm, and the pulling speed, to 100 mm/min. The modulus of elasticity was calculated by using a stress at 2% distortion. The sectional area of the filament required for calculation was determined by measuring the weight and length of the filament with the density of polyethylene taken as 0.96 g/cm$^3$.

TABLE 7

| | Stretch ratio | | | | | |
|---|---|---|---|---|---|---|
| Run No. | 10.0 31 | 12.0 32 | 14.0 33 | 16.3 34 | 18.0 35 | 20.0 36 |
| Modulus of elasticity (*) (GPa) | 9.84 | 15.0 | 19.0 | 28.2 | 31.7 | 36.3 |
| Tensile strength (GPa) | 0.98 | 1.22 | 1.30 | 1.46 | 1.47 | 1.53 |

(*) Measured by an Instron Universal tester (Model 1123).

EXAMPLE 7

A 25:75 blend of ultrahigh-molecular-weight polyethylene ($[\eta]=8.20$ dl/g) and paraffin wax (melting point=69° C., molecular weight=460) was melt-spun and stretched under the same conditions as in Example 6 except as noted below. The molten mixture was extruded from a die having an orifice diameter of 1 mm, and solidified in cold water at 20° C. with an air gap of 10 cm. The melt-extrusion was carried out under a draft so that the diameter of the solidified filament became 0.20 mm (specifically at a draft ratio of 5).

Table 8 summarizes the moduli of elasticity and tensile strengths at the various stretch ratios. It is seen from Table 8 that a stretched article having a high tensile strength can be obtained even at a stretch ratio of about 8:1.

TABLE 8

|  | Stretch ratio | | | |
| --- | --- | --- | --- | --- |
|  | 8.0 | 10.0 | 12.0 | 14.0 |
| Run No. | 37 | 38 | 39 | 40 |
| Modulus of elasticity (*) (GPa) | 10.3 | 19.4 | 32.5 | 33.5 |
| Tensile strength (GPa) | 1.05 | 1.51 | 1.54 | 1.72 |

(*) Measured by Instron Model 1123.

EXAMPLE 8

A 25:75 blend of ultrahigh-molecular-weight polyethylene ($[\eta]=8.20$ dl/g) and paraffin wax (melting point=69° C., molecular weight=460) was melt-spun and stretched under the same conditions as in Example 6 except as noted below. The molten mixture was extruded from a die having an orifice diameter of 2 mm, and solidified in cold water at 20° C. with an air gap of 10 cm. The melt-extrusion was carried out under a draft so that the diameter of the solidified filament became 0.04 mm (specifically at a draft ratio of 50).

Table 9 summarizes the moduli of elasticity and tensile strengths at the various stretch ratios. It is seen that by increasing the draft ratio from that used in Example 7, a stretched article having a high tensile strength can be obtained even at a stretch ratio of about 6.

TABLE 9

|  | Stretch ratio | | | |
| --- | --- | --- | --- | --- |
|  | 5.6 | 6.7 | 8.0 | 9.2 |
| Run No. | 41 | 42 | 43 | 44 |
| Modulus of elasticity (*) (GPa) | 23.9 | 31.2 | 36.5 | 50.6 |
| Tensile strength (GPa) | 1.49 | 1.80 | 1.81 | 2.43 |

(*) Measured by Instron Model 1123.

EXAMPLE 9

A 25:75 blend of ultrahigh-molecular-weight polyethylene ($[\eta]=8.2$ dl/g) and paraffin wax (melting point=69° C., molecular weight=460) was molded into a film by a T-die and stretched under the following conditions.

A powder of the polyethylene and pulverized paraffin wax were mixed, and melt-kneaded and pelletized by a screw extruder (20 mm in diameter, L/D=20) while maintaining the temperature of the mixture at 190° C. The pellets were molded into a film by a screw extruder (20 mm in diameter, L/D=20) equipped with a coat hanger-type die (lip length=300 mm, lip thickness=0.5 mm) at 220° C. The width of the film was adjusted to 300 mm by using a roll cooled with cold water at 20° C. Subsequently, the film was stretched in a stretching vessel (the temperature of the inside of the vessel=130° C., the length of the vessel=80 cm) containing n-decane as a heat medium by using a pair of snap rolls.

While the rotating speed of a first snap roll was set at 0.5 m/min., stretched tapes of different stretch ratios were obtained by varying the rotating speed of a second snap roll. The stretch ratios were calculated from the rotating ratios of the snap rolls. Table 10 summarizes the moduli of elasticity, tensile strengths and tape widths at the various stretch ratios.

TABLE 10

|  | Stretch ratio | | | | | |
| --- | --- | --- | --- | --- | --- | --- |
|  | 15.4 | 24.0 | 27.0 | 33.9 | 46.5 | 53.0 |
| Run No. | 45 | 46 | 47 | 48 | 49 | 50 |
| Modulus of elasticity (*) (GPa) | 13.3 | 22.6 | 26.2 | 34.6 | 49.1 | 59.4 |
| Tensile strength (GPa) | 0.91 | 1.27 | 1.40 | 1.55 | 1.73 | 1.81 |
| Width of the tape (mm) | 75.8 | 60.5 | 57.0 | 50.2 | 43.3 | 39.8 |

(*) Measured by Instron Model 1123.

EXAMPLE 10

A 25:75 blend of ultrahigh-molecular-weight polyethylene ($[\eta]=8.2$ dl/g) and paraffin wax (melting point=84° C., molecular weight=700) was molded into a film by a T-die and then stretched under the same conditions as in Example 9 except that a draft was applied to the unstretched extrudate during melting from the lip having a width of 300 mm so that the width of the film became 43 mm.

Table 11 summarizes the moduli of elasticity, tensile strengths and tape widths at the various stretch ratios.

TABLE 11

|  | Stretch ratio | | | |
| --- | --- | --- | --- | --- |
|  | 2.0 | 4.0 | 5.0 | 7.0 |
| Run No. | 51 | 52 | 53 | 54 |
| Modulus of elasticity (*) (GPa) | 8.2 | 16.2 | 29.8 | 62.3 |
| Tensile strength (GPa) | 0.93 | 1.60 | 2.01 | 2.23 |
| Width of the tape (mm) | 30.1 | 20.8 | 19.3 | 15.8 |

(*) Measured by Instron Model 1123.

COMPARATIVE EXAMPLE 6

A 50:50 blend of ultrahigh-molecular-weight polyethylene ($[\eta]=8.2$ dl/g) and high-density polyethylene (melting point=130° C., molecular weight=40,000) was molded into a film by a T-die and then stretched under the same conditions as in Example 9. Since with this blend application of a draft to the unstretched extrudate during melting would cause breakage during stretching, the film was molded in a width of 300 mm. Table 12 summarizes the moduli of elasticity, tensile strengths and tape widths. It is seen that with this mixture, a high stretch ratio could not be achieved, and tapes having a high modulus of elasticity and a high tensile strength could not be obtained.

TABLE 12

| Run No. | Stretch ratio | | | |
|---|---|---|---|---|
| | 5.4 | 8.2 | 12.4 | 17.5 |
| | 55 | 56 | 57 | 58 |
| Modulus of elasticity (*) (GPa) | 3.8 | 5.1 | 11.0 | 15.2 |
| Tensile strength (GPa) | 0.23 | 0.34 | 0.41 | 0.48 |
| Width of the tape (mm) | 127.5 | 103.0 | 85.2 | 70.3 |

(*) Measured by Instron Model 1123.

What is claimed is:

1. A process for producing a stretched article of ultrahigh-molecular-weight polyethylene, which comprises, (1) melt-kneading a mixture composed of (A) 15 to 80 parts by weight, per 100 parts by weight of the components (A) and (B) combined, of ultrahigh-molecular-weight polyethylene having an inherent viscosity ($\eta$), determined at 135° C. in decalin, of at least 5 dl/g and (B) 85 to 20 parts by weight, per 100 parts by weight of the components (A) and (B) combined, of a paraffinic wax having a melting point, determined by the DSC method, of 40° to 120° C. and a weight average molecular weight ($\overline{M}w$), determined by the GPC method, of at least 230 but less than 2,000 in a screw extruder while maintaining the temperature of the mixture at 180° to 280° C., (2) melt-extruding the molten mixture through a die kept at a temperature of 180° to 300° C., under a draft condition of a draft ratio of less than 2 or in the absence of a draft, (3) cooling the resulting unstretched extrudate to solidify it, and (4) subjecting the unstretched solidified extrudate to a stretching treatment at a temperature of 60° to 140° C. at a stretch ratio of at least about 3:1 when the step (2) is carried out while a draft is applied to the unstretched extrudate or at a stretch ratio of at least about 10:1 when step (2) is carried out in the absence of a draft, said stretching treatment is carried out in a heated liquid medium which is a solvent for the paraffinic wax (B) whereby the paraffinic wax (B) is extracted from the extrudate simultaneously with the stretching treatment, such that the amount of the wax (B) remaining in the stretched articles is not more than about 10% by weight.

2. The process of claim 1 wherein the inherent viscosity of the ultrahigh-molecular-weight polyethylene (A) is 5 to 30 dl/g.

3. The process of claim 1 wherein the stretch ratio in step (4) is from 3:1 to 50:1 when a draft is applied, or from 1:10 to 100:1 when a draft is not applied.

4. The process of claim 1 wherein the paraffinic wax (B) is a member selected from the group consisting of n-alkanes having at least 22 carbon atoms, mixtures of a major proportion of the n-alkanes and a minor proportion of lower n-alkanes, paraffin wax, polyethylene waxes, ethylene copolymer waxes, heat-degraded polyethylene waxes, heat-degraded ethylene copolymer waxes, oxidation products of these waxes, and alpha, beta-unsaturated acid-modified products of the foregoing waxes.

5. The process of claim 1 wherein the heated liquid medium is a liquid medium having a boiling point higher than the stretching temperature employed.

6. The process of claim 1 wherein step (2) is performed under said draft condition.

7. The process of claim 1 wherein step (2) is performed in the absence of a draft.

* * * * *